US012505681B2

(12) United States Patent
Nahum-Gefen et al.

(10) Patent No.: US 12,505,681 B2
(45) Date of Patent: Dec. 23, 2025

(54) PARKING SLOT DETECTION

(71) Applicant: IMAGRY ISRAEL LTD., Haifa (IL)

(72) Inventors: Shai Nahum-Gefen, Tel Aviv (IL); Ilan Shaviv, Shimshit (IL); Nikolai Nikola, Haifa (IL)

(73) Assignee: IMAGRY ISRAEL LTD., Haifa (IL)

( * ) Notice: Subject to any disclaimer, the term of this patent is extended or adjusted under 35 U.S.C. 154(b) by 30 days.

(21) Appl. No.: 18/436,327

(22) Filed: Feb. 8, 2024

(65) Prior Publication Data

US 2025/0259456 A1    Aug. 14, 2025

(51) Int. Cl.
| | |
|---|---|
| *G06V 20/58* | (2022.01) |
| *G06T 7/70* | (2017.01) |
| *G06V 10/764* | (2022.01) |
| *G06V 10/82* | (2022.01) |
| *H04N 5/265* | (2006.01) |

(52) U.S. Cl.
CPC .............. *G06V 20/586* (2022.01); *G06T 7/70* (2017.01); *G06V 10/764* (2022.01); *G06V 10/82* (2022.01); *H04N 5/265* (2013.01); *G06T 2207/20076* (2013.01); *G06T 2207/20084* (2013.01); *G06T 2207/30264* (2013.01)

(58) Field of Classification Search
None
See application file for complete search history.

(56) References Cited

U.S. PATENT DOCUMENTS

| | | | | |
|---|---|---|---|---|
| 10,957,198 | B1* | 3/2021 | Hao | G08G 1/14 |
| 2009/0207045 | A1* | 8/2009 | Jung | G06T 7/74 |
| | | | | 340/932.2 |
| 2009/0243889 | A1 | 10/2009 | Suhr et al. | |
| 2016/0321926 | A1* | 11/2016 | Mayer | G08G 1/0129 |
| 2020/0082185 | A1* | 3/2020 | Yamamoto | B60R 1/27 |
| 2021/0216797 | A1 | 7/2021 | Joos et al. | |
| 2022/0203964 | A1 | 6/2022 | Ip et al. | |

(Continued)

FOREIGN PATENT DOCUMENTS

| | | | | |
|---|---|---|---|---|
| EP | 3764335 | | 1/2021 | |
| EP | 3764335 | A1 * | 1/2021 | ......... G06K 9/00812 |
| WO | WO-2023054520 | A1 * | 4/2023 | ............ B60W 30/06 |

OTHER PUBLICATIONS

ISR and WO for PCT/IL2025/050088 (Mar. 26, 2025).

*Primary Examiner* — James M Anderson, II

(57) ABSTRACT

A method, program product, apparatus and system for parking slot detection. The method involves obtaining a top-down representation of the surrounding area around a vehicle based on images from cameras mounted on the vehicle. The method comprises obtaining a top-down representation of a surrounding area around a vehicle, that is generated based images from cameras mounted on the vehicle. Detection of parking slot objects in the top-down representation is performed using an Artificial Neural Network (ANN)-based object detection model to detect parking objects from different classes, such as vacant, blocked, occupied, and indistinct. The model is configured to output a plurality of heat-maps, each of which is associated with an individual class of parking slot and a matrix of the same dimensions as the heatmap, indicating, in each cell, an orientation measurement indicating an orientation of a parking slot object that has a center at the respective cell.

19 Claims, 5 Drawing Sheets

(56) References Cited

U.S. PATENT DOCUMENTS

| | | |
|---|---|---|
| 2022/0207277 A1 | 6/2022 | Ip et al. |
| 2022/0292846 A1* | 9/2022 | Tamura ................. G06V 10/82 |
| 2023/0146185 A1 | 5/2023 | Ho et al. |
| 2024/0227785 A1 | 7/2024 | Wang et al. |

* cited by examiner

PARKING SLOT DETECTION

TECHNICAL FIELD

The present disclosure relates to computer vision in general, and to parking slot detection based on visual input, in particular.

BACKGROUND

As urbanization continues to rise, the demand for efficient parking solutions has become increasingly critical. The conventional parking experience often involves time-consuming searches for available parking spaces, leading to congestion, frustration, and environmental impact. Traditional parking systems rely on manual methods or limited sensor-based technologies, resulting in inaccurate information about available parking spaces. This inefficiency can be significantly improved through the integration of computer vision techniques for parking slot detection.

Computer Vision in Parking Slot Detection Computer vision is an interdisciplinary field that focuses on enabling machines to interpret and understand visual data. It involves the development of algorithms and techniques to analyze, process, and extract meaningful information from images or videos. In the context of parking slot detection, computer vision algorithms can be used to identify vacant and occupied parking spaces, monitor parking occupancy, and provide real-time updates to users.

BRIEF SUMMARY

One exemplary embodiment of the disclosed subject matter is a method for parking slot detection, the method comprising: obtaining a top-down representation of a surrounding area around a vehicle, the top-down representation is generated based on one or more images from one or more cameras that are mounted on the vehicle: performing detection of parking slot objects in the top-down representation of the surrounding area around the vehicle, wherein said detection comprises: utilizing an Artificial Neural Network (ANN)-based object detection model to detect at least two parking slot classes, whereby obtaining a plurality of detected parking slot objects in the surrounding area around the vehicle, each of which is classified as one individual class of the at least two different parking slot classes, wherein the ANN-based object detection model is configured to output a plurality of heat-maps, each individual heat-map of the plurality of heat-maps is associated with an individual class of the at least two different parking slot classes, wherein each heat-map of the plurality of heat-maps having H×W dimensions, indicates, in each pixel thereof, a confidence of the ANN-based object detection model of a detection of a parking slot object from the respective class and a matrix, having H×W dimensions, indicating, in each cell, an orientation measurement indicating an orientation of a parking slot object that has a center at the respective cell: and determining a subset of the plurality of detected parking slot objects, wherein said determining comprises removing at least one a first detected parking slot object of a first class that collides with a second detected parking slot object of a second class, the first class is different than the second class, the subset comprises the second detected parking slot object and excludes the first detected parking slot object: and outputting the subset of the plurality of detected parking slot objects with corresponding orientation measurements thereof.

Optionally, the one or more cameras comprise at least a first camera that captures a front view of the vehicle, a second camera that captures a left view of the vehicle, a third camera that captures a right view of the vehicle, and a fourth camera that captures a back view of the vehicle, wherein the top-down representation is based on a combination of images from the first camera, the second camera, the third camera and the fourth camera.

Optionally, the at least two parking slot classes comprises a vacant parking slot class, a blocked parking slot class, an occupied parking slot class, and an indistinct parking slot class, wherein the vacant parking slot class is a parking slot that is available for parking by the vehicle, wherein the occupied parking slot class is a parking slot that is occupied by another vehicle, wherein the blocked parking slot class is a parking slot that is unavailable for the vehicle although not being occupied, wherein the indistinct parking slot class is a parking slot that is not classified as vacant, occupied or blocked.

Optionally, the orientation measurement is indicative of an angle of parking slot object that has a center at the respective cell.

Optionally, said outputting is performed to an autonomous driver of the vehicle, whereby enabling the autonomous driver to parking the vehicle in a parking slot without human intervention.

Optionally, said performing detection of parking slot objects is performed without relying on a pre-defined on-surface markings that define the boundaries of parking slot objects in which vehicles are allowed to park.

Optionally, the vacant parking slot object is a conceptual object that has no physical material above a surface thereof.

Optionally, the ANN-based object detection model outputs the first detected parking slot object, the second detected parking slot object and a single angle measurement that is applicable to both the first detected parking slot object and the second detected parking slot object.

Optionally, the top-down representation of the surrounding area around the vehicle comprises at least 5-meter front-view of the vehicle.

Optionally, the top-down representation of the surrounding area around the vehicle comprises at least 8-meter front-view of the vehicle.

The method of claim 1 further comprises generating the top-down representation of the surrounding area around the vehicle, wherein said generating comprises excluding information that is captured by the one or more cameras regarding locations that are further to the vehicle over a pre-defined maximal threshold, wherein the pre-defined maximal threshold is at least 5-meters.

Optionally the method further comprises generating the top-down representation of the surrounding area around the vehicle, wherein said generating comprises excluding information that is captured by the one or more cameras regarding the vehicle.

Optionally, each individual heat-map of the plurality of heat-maps indicates for each pixel thereof, a probability of the pixel representing a center of a respective parking slot object, wherein said utilizing the ANN-based model comprises performing a local search of a maximal probability value within a heat-map to identify a candidate of a center point of a parking slot object within the heat-map.

Optionally, each individual heat-map of the plurality of heat-maps indicates for each pixel thereof, a probability of the pixel representing a center of a respective parking slot object, wherein the first detected parking slot object is associated with a first probability, wherein the second detected parking slot object is associated with a second probability, wherein said determining the subset of the plurality of detected parking slot objects comprises determining that based on a collision rule between the first class and the second class, and based on the first probability and the second probability, the first detected parking slot object is to be excluded from the subset of the plurality of detected parking slot objects.

Optionally, said outputting comprises displaying to a human driver a graphical display of parking slots and their respective classes within the surrounding area around the vehicle.

Optionally, the one or more cameras comprise fish-eye cameras.

The method of claim 1, wherein the top-down representation of the surrounding area around the vehicle has a 360-degree coverage around the vehicle.

Another exemplary embodiment of the disclosed subject matter is a computerized apparatus having a hardware processor, the hardware processor being coupled to a memory, the hardware processor being adapted to perform the steps of: obtaining a top-down representation of a surrounding area around a vehicle, the top-down representation is generated based on one or more images from one or more cameras that are mounted on the vehicle: performing detection of parking slot objects in the top-down representation of the surrounding area around the vehicle, wherein said detection comprises: utilizing an ANN-based object detection model to detect at least two parking slot classes, whereby obtaining a plurality of detected parking slot objects in the surrounding area around the vehicle, each of which is classified as one individual class of the at least two different parking slot classes, wherein the ANN-based object detection model is configured to output a plurality of heat-maps, each individual heat-map of the plurality of heat-maps is associated with an individual class of the at least two different parking slot classes, wherein each heat-map of the plurality of heat-maps having H×W dimensions, indicates, in each pixel thereof, a confidence of the ANN-based object detection model of a detection of a parking slot object from the respective class and a matrix, having H×W dimensions, indicating, in each cell, an orientation measurement indicating an orientation of a parking slot object that has a center at the respective cell; and determining a subset of the plurality of detected parking slot objects, wherein said determining comprises removing at least one a first detected parking slot object of a first class that collides with a second detected parking slot object of a second class, the first class is different than the second class, the subset comprises the second detected parking slot object and excludes the first detected parking slot object: and outputting the subset of the plurality of detected parking slot objects with corresponding orientation measurements thereof.

Yet another exemplary embodiment of the disclosed subject matter is a computer program product comprising a non-transitory computer readable storage medium retaining program instructions, which program instructions when read by a processor, cause the processor to perform a method comprising: obtaining a top-down representation of a surrounding area around a vehicle, the top-down representation is generated based on one or more images from one or more cameras that are mounted on the vehicle: performing detection of parking slot objects in the top-down representation of the surrounding area around the vehicle, wherein said detection comprises: utilizing an ANN-based object detection model to detect at least two parking slot classes, whereby obtaining a plurality of detected parking slot objects in the surrounding area around the vehicle, each of which is classified as one individual class of the at least two different parking slot classes, wherein the ANN-based object detection model is configured to output a plurality of heat-maps, each individual heat-map of the plurality of heat-maps is associated with an individual class of the at least two different parking slot classes, wherein each heat-map of the plurality of heat-maps having H×W dimensions, indicates, in each pixel thereof, a confidence of the ANN-based object detection model of a detection of a parking slot object from the respective class and a matrix, having H×W dimensions, indicating, in each cell, an orientation measurement indicating an orientation of a parking slot object that has a center at the respective cell; and determining a subset of the plurality of detected parking slot objects, wherein said determining comprises removing at least one a first detected parking slot object of a first class that collides with a second detected parking slot object of a second class, the first class is different than the second class, the subset comprises the second detected parking slot object and excludes the first detected parking slot object; and outputting the subset of the plurality of detected parking slot objects with corresponding orientation measurements thereof.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
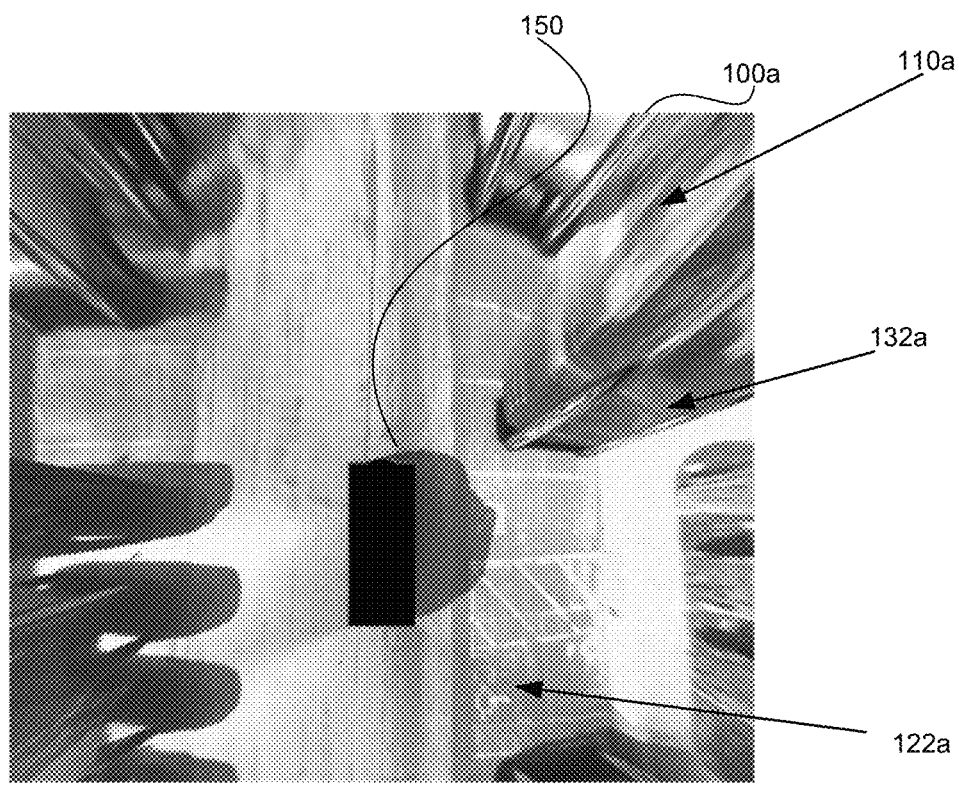
FIGS. 1A-1B show schematic illustrations of exemplary top-down representations of a road segment and markings of classified parking slot objects thereon, in accordance with some exemplary embodiments of the disclosed subject matter.

One technical problem dealt with by the disclosed subject matter is to efficiently identify and locate valid parking slots around a vehicle, during driving, and particularly autonomously driving. Parking slots may have various designs, including parallel parking spaces, perpendicular parking spaces, tilted parking spaces, or the like. In some cases, the same parking lot may comprise hybrid designs of parking slots. Adapting to these diverse layouts poses a challenge for detection systems. Additionally, or alternatively, various environmental conditions, such as different lighting conditions, weather (rain, snow, fog), time of day, or the like, may affect the ability to identify available parking slots. Ensuring robustness and reliability under diverse environmental factors may be desired.

Another technical problem dealt with by the disclosed subject matter is to identify and locate parking slots without relying on a pre-defined on-surface markings, such as markings on the road that define the boundaries of parking slots in which vehicles are allowed to park. Classic automatic parking slot detection techniques typically rely on the detection of markings, usually on the surface of the road, that define the boundaries, size, orientation or shape of parking slots. The markings may include painted lines or symbols that designate where vehicles are allowed to park. Such techniques detect and recognize on-surface markings on the road to determine where parking is permitted and guide the vehicle to navigate within the marked boundaries. Despite the reliance on these markings being fundamental to ensure that the vehicle parks accurately and safely, such reliance may limit the adaptivity to various environments, including in cases where such marking are not clearly visible.

In some exemplary embodiments, automatic parking techniques heavily depend on clear and visible on-surface markings. If the markings are faded, obscured, or absent due to poor road conditions, weather conditions, or other environmental factors, such techniques may struggle to identify parking slots accurately. Additionally, or alternatively, conventional parking techniques may typically be designed with assumptions about the presence of specific road markings, and may not be applicable in environments with unconventional parking arrangements, such as parking lots without standard markings, scenarios where vehicles can park in non-traditional spaces, such as a non-paved parking lot, or when the vehicles are not in a regular average size or shape. Such techniques may be vulnerable to changes in the markings. As an example, any changes or modifications to road markings, either intentional (such as repainting the lines) or unintentional (such as damage to the markings), can disrupt locating park slots and may fail to adapt to alterations in the parking area. As another example, in scenarios where there are no clear on-surface markings designating parking spaces, such as in open spaces or unconventional parking scenarios, marking-dependent techniques may struggle to operate effectively. These limitations hinder the flexibility and applicability of such marking-dependent techniques in diverse environments.

Yet another technical problem dealt with by the disclosed subject matter is enabling automatic parking within unstructured parking areas. Parking spaces may not always be clearly defined or structured, especially in open spaces or unconventional parking scenarios.

Yet another technical problem dealt with by the disclosed subject matter is to accurately detect and classify conditions or obstacles in parking slots rendering such parking slots invalid for parking.

One technical solution is to identify and locate parking slots from Around View Monitor (AVM) images gathered from fish-eye cameras using a machine learning-based object detector.

The disclosed subject matter is exemplified using fish-eye cameras and AVM images. However, the disclosed subject matter is not limited to such type of cameras or such type of images. Other types of cameras or visual sensors may be utilized, as well as different representations of the surroundings (complete or partial) of the vehicle.

In some exemplary embodiments, a top-down representation of the surrounding area around the vehicle may be generated based on combining images from a plurality of fish-eye cameras that are mounted on the vehicle, such as a front view, a left view, a right view, and a back view of the vehicle, any other combination of aggregated views around the vehicle, or the like. As an example, an AVM image may be generated as a top-down representation providing a top-down view of the vehicle and its surroundings. The AVM may be generated on the fly and in real-time (e.g., such as within a short time from the images being captured, such as less than a minute, 30 seconds, 10 seconds, a second, or the like). In some exemplary embodiments, the top-down representation may be based on an aggregated set of views that provide a 360-degree coverage of the vehicle's surroundings. The top-down representation may be generated by stitching images from multiple cameras positioned around the vehicle to create a composite or panoramic view.

In some exemplary embodiments, information that is captured by the plurality of fish-eye cameras regarding locations that are further to the vehicle over a pre-defined maximal threshold may be excluded when generating the top-down representation. Additionally, or alternatively, geometrical transformation may be performed on at least four images capturing the right side, left side, front and behind the vehicle, to project and stitch the images into a single top-down representation image. The top-down representation may be configured to provide a clear image of about 9 meters at each side of the vehicle to enables capturing the whole perpendicular depth of potential parking spot. Additionally, or alternatively, the top-down representation may be configured to provide a representation of at least 5-meter front-view of the vehicle, at least 8-meter front-view of the vehicle, or the like. It is noted that changes of ±20% of the above-mentioned measures are also acceptable.

For the avoidance of doubt, it is noted that instead of a top-down representation, an alternative elevated view may be utilized, such as a bird-eye's view; a perspective view from a position above the vehicle and facing forward, or the like. For simplicity, and without limiting the scope of the disclosed subject matter, the description focuses on the top-down representation embodiment.

In some exemplary embodiments, An ANN-based object detection model may be utilized to detect all valid parking slot objects in the surrounding area around the vehicle and classify them as one of potential set of classes, such as vacant, blocked, occupied, or indistinct parking slot objects. The ANN-based object detection model may be configured to analyze the top-down representation of the surrounding area around the vehicle (e.g., the AVM image) to locate the centers of all the parking slots therein and classify them according to their states. As an example, the ANN-based object detection model may be based on the architecture of CenterNet open-sourced object detector, configured to detect objects on a 2-dimensional image, with bounding boxes that are not necessarily axes aligned, whereby capturing each parking slot as an object, along with its orientation. In some exemplary embodiments, ANN-based object detection model may be configured to identify parking slot objects as conceptual non-physical objects (e.g., with no physical material above a surface thereof). In particular, a vacant parking slot object is a "void" status in which the parking space (such as a rectangular space in the size of a vehicle) is unoccupied, meaning there are no obstacles such as other cars or objects that could hinder the parking process or interfere with the parking maneuver in that specific area. It is noted that the use of object detection to detect a conceptual object is unorthodox, and very much counter-intuitive, as the conceptual object is many times defined by what is missing and not what is present. Furthermore, the object detection may be used to detect any one of the potential different classes of parking slots, which generally represent different "states" of the same physical location (e.g., whether the parking slot is vacant or occupied, still refers to the same "parking slot").

In some exemplary embodiments, the ANN-based object detection model may be configured to output a plurality of heat-maps indicating confidence measurements of the ANN-based object detection model. Each heat map may indicate confidence measurements relating to a detection of the parking slot object and classification thereof. Separated maps may be outputted for each class of the parking slot objects, e.g., a heat map for vacant parking slot objects, a heat map for occupied parking slot objects, a heat map for blocked parking slot objects, and a heat map for indistinct parking slot objects. Additional heat maps may be outputted for additional classes, if exited. Each of heat-maps indicates for each pixel thereof, a probability of the pixel representing a center of a respective parking slot object. The ANN-based model may be configured to perform a local search of a maximal probability value within a heat-map to identify a candidate of a center point of a parking slot object within the heat-map. The ANN-based object detection model may be further configured to output a matrix of the same dimensions of the heat maps, indicating, in each cell, an angle of a parking slot object that has a center at the respective cell, height, width, error quantization, or other characteristics of the parking slot object. It may be noted that the detection of the parking slot objects is performed without relying on a pre-defined on-surface markings that define the boundaries of parking slot objects in which vehicles are allowed to park.

In some exemplary embodiments, rule-based algorithms may be applied on the potential parking slot objects to choose a subset of the plurality of detected parking slot objects. The subset of the plurality of detected parking slot objects may be determined by selecting a parking slot object of a certain first class that collides with a second class based on collision rules associated with confidence measurement of each of the classes. As an example, a collision rule between two classes may be based on the relation between their respective confidence measurements (e.g., estimated probabilities that each classification is correct, as provided by the classifier). In some cases, the collision rule may disregard classification below a relevant minimal confidence threshold. The minimal confidence threshold may be different for different classes. Additionally, or alternatively, the collision rule may prefer a classification with the highest confidence measurement. Additionally, or alternatively, the collision rule may make a more conservative selection, preferring to err on the side of caution. For example, given similar confidence measurements (e.g., within a predetermined range), an occupied classification of a parking slot may be preferred over a vacant classification. Consider the following example: a determination of an occupied parking slot with 80% confidence may be preferred over a determination of a vacant parking slot that physically collides with the occupied parking slot, even though the vacant parking slot has a 90% confidence. As another example of a conservative collision rule, given a minimal confidence threshold of a specific classification, such as an occupied parking slot classification, such classification may be selected irrespective of other potential classifications.

In some exemplary embodiments, based on the output of the ANN-based object detection model markings may be added on top of the top-down representation of the surrounding area around the vehicle. The markings may be indicative of the parking slots. In some exemplary embodiments, different color or annotations may be utilized to indicate different class of the parking slot (e.g., occupied, vacant, blocked, indistinct parking, or the like). The markings may be of rectangle shapes based on locations of a center of the parking slot, an angle, width and height thereof. This information may be derived from the heat maps and the geometric details provided in the matrices.

The output may be displayed to human drivers as a graphical display of parking slots and their respective classes within the surrounding area around the vehicle. Additionally, or alternatively, the output may be utilized by autonomous driving systems to enable parking the vehicle in a parking slot without human intervention.

In some exemplary embodiments, it may be important to identify a parking slot, even if it is not a valid parking slot for the current parking task. As an example, identification of such parking slot may be useful for identification of additional parking slots that are included in the same series of parking slots. As an example, a parking slot may be occupied by another parking vehicle, rendering the parking slot as unavailable for parking. As another example, a parking slot may be blocked by an obstacle, such as a pedestrian or an object within the parking area. Avoiding collisions with these obstacles is crucial for safe and efficient parking. The parking slot may be considered block despite not being occupied by another vehicle. The parking slot may be classified as blocked even if it is not physically blocked, such as when the access to the parking slot is blocked by an obstacle, rendering the parking slot unavailable for parking, or when a permission is required for parking in this parking slot, such as in disabled parking, reserved parking, or the like.

Additionally, or alternatively, in some cases, it may not be possible to definitely classify the identified parking slot, e.g., it cannot be classified as vacant, occupied or blocked. However, the classification of such parking slot as an indistinct parking slot may be useful for ensuring clarity in the parking environment, enhancing safety, optimizing resource utilization, and improving the overall user experience in both autonomous and human-driven vehicles. Detecting indistinct parking slots helps avoid ambiguity and provides a more accurate understanding of the parking environment. Additionally, or alternatively, indistinct parking slots may pose safety concerns as they may not conform to standard parking conditions. Detecting and flagging these slots can contribute to overall safety by preventing the autonomous vehicle from attempting to park in areas that are not clearly defined for parking. Furthermore, identification of indistinct parking slots may be important for improved decision-making in autonomous driving systems or assistances system aiding human drivers. The systems may be enabled to make informed choices about whether to attempt parking in such areas or to prioritize other, more clearly defined parking slots One technical effect of utilizing the disclosed subject matter is enhancing the accuracy, adaptability, and robustness of parking slot detection systems in autonomous parking applications. The disclosed solution may be used as a stand-alone, end-to-end module, or seamlessly integrated with other perception networks, leveraging their information to enhance the precision of its predictions. While the module exhibits strong performance independently, its ability to interface with supplementary modules becomes particularly advantageous in novel scenarios or when encountering unfamiliar objects. This adaptive quality ensures that the system remains effective and reliable across a wide range of parking environments, contributing to its overall efficacy in autonomous parking applications.

Another technical effect of utilizing the disclosed subject matter is to provide a general solution for parking with zero prior assumptions. The disclosed solution does not rely on prior assumptions about road markings, parking slot orientation, or size. It directly detects parking slots, making it adaptable to a wide variety of parking lots with different markings or no markings at all. The disclosed subject matter is a single solution that can be seamlessly utilized for all scenarios including paved and non-paved parking areas, without having to identify the specific relevant scenario.

Yet another technical effect of utilizing the disclosed subject matter is to enable accurate identification of parking spots, even given partial visibility, such as when using low fisheye cameras, where Line Of Sight (LOS) is highly limited, in limited field of view; or the like. As the disclosed approach relies on spatial key-point based object detection, it enables the model to use contextual information about the whole scene, enabling to identify parking lots (as centered objects instead of grids) even when not entirely visual.

Yet another technical effect of utilizing the disclosed subject matter is to provide an enhanced detection granularity. The solution's capability to detect objects on surfaces and signs significantly enhances context awareness and object detection granularity in three-dimensional space. Beyond a binary classification of parking slot states, such as vacant or not vacant, the disclosed solution enables discerning specific obstacles like handicapped signs or pedestrians near parking slots. This fine-grained classification offers a nuanced representation of the parking environment, enabling real-time state adaptation based on dynamic factors. This heightened awareness not only improves the accuracy of parking slot classification but also enhances safety and accessibility considerations, making the solution more robust and responsive to diverse elements in the surroundings.

Yet another technical effect of utilizing the disclosed subject matter is enabling the identification of "partial" parking slot objects, e.g., parking objects that cannot be definitively classified at the current moment. While these objects may not have a determined state or a clear classification, their identification holds may be important for future identification and localization of parking objects. Recognizing these partial parking objects contributes to an evolving understanding of the environment. As the system continues to gather data and learns over time, these partial identifications act as crucial reference points, aiding in the eventual accurate classification and localization of parking objects in the frames that follow. This forward-looking approach enhances the system's adaptability and contributes to continuous improvement in its ability to discern and categorize parking spaces. The identification of indistinct parking slots or partial parking slots, may improve the model's confidence in detecting other classes of parking slot objects. In particular, identification of parking slot objects classified as "indistinct" enables identification of the parking slot as an object, that can be utilized either for locating other parking slot objects, and reducing the number of false positive results in each of the classification, especially in "vacant" parking slots, without increasing the number of false negative results, such as identifying a parking slot as "occupied" or "blocked" while in fact being more "vacant" in certain scenarios.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1A showing a schematic illustration of an exemplary top-down representation of a road segment, in accordance with some exemplary embodiments of the disclosed subject matter.

In some exemplary embodiments, Image 100a may be a schematic illustration of a top-down representation of a road segment depicting a surrounding area around a vehicle. Image 100a may represent a composite, bird's-eye view image of the area surrounding the vehicle. Image 100a may be generated based on combining images from a plurality of cameras that are mounted on the vehicle, such as facing left, right, back and front, at a height of the vehicle and substantially below the viewpoint shown in Image 100a.

In some exemplary embodiments, each pixel in Image 100a may represent information corresponding to a specific portion of the real-world surroundings captured by the cameras. The color and intensity of each pixel convey information about the objects, surfaces, or features present in that particular area. The resolution and quality of Image 100a may depend on the capabilities of the individual cameras capturing the images which Image 100a a is generated based thereon, the stitching process, or the like (See, for example, the generation of Image 350 based on Images 310-340 in FIG. 3).

In some exemplary embodiments, pixels in Rectangle Shape 150 represent the vehicle of interest, e.g., the vehicle associated with the AVM system, the vehicle utilizing an automatic parking detection system, the vehicle from which the fish-eye images are captured, or the like. Information regarding the vehicle is discarded and a black shape indicating an area devoid of information is presented in Image 100a.

In some exemplary embodiments, there may be blind spots corresponding to areas in the environment not covered by the cameras capturing the images which Image 100a a is generated based thereon. Such blind spots may correspond to locations at a blocked view from the vehicle, locations directly underneath the vehicle, locations in a close proximity to the vehicle, locations in the edges of the frames of the camera, or the like. As an example, the view to area 110a is blocked by another object, and therefore it may be considered as a blind spot, even though the pixel is not black, the information contained in it represents an obstacle blocking the view to the respective location that pixel represents.

Additionally, or alternatively, Image 100a may comprise a representation of objects, obstacles, or the like, such as Car 132a, a Disabled Sign 122a, a pedestrian, an obstacle, a gate, or the like. As can be appreciated, Car 132a blocks some of the view and creates blind spot 110a.

It may be noted that the disclosed subject matter does not rely on pre-defined on-surface markings that define the boundaries of parking slot objects in which vehicles are allowed to park. Image 100a does include some such on-surface markings, with respect to some of the parking slots, however, the disclosed subject matter operates even in the absence of such markings.

Figure 1B:
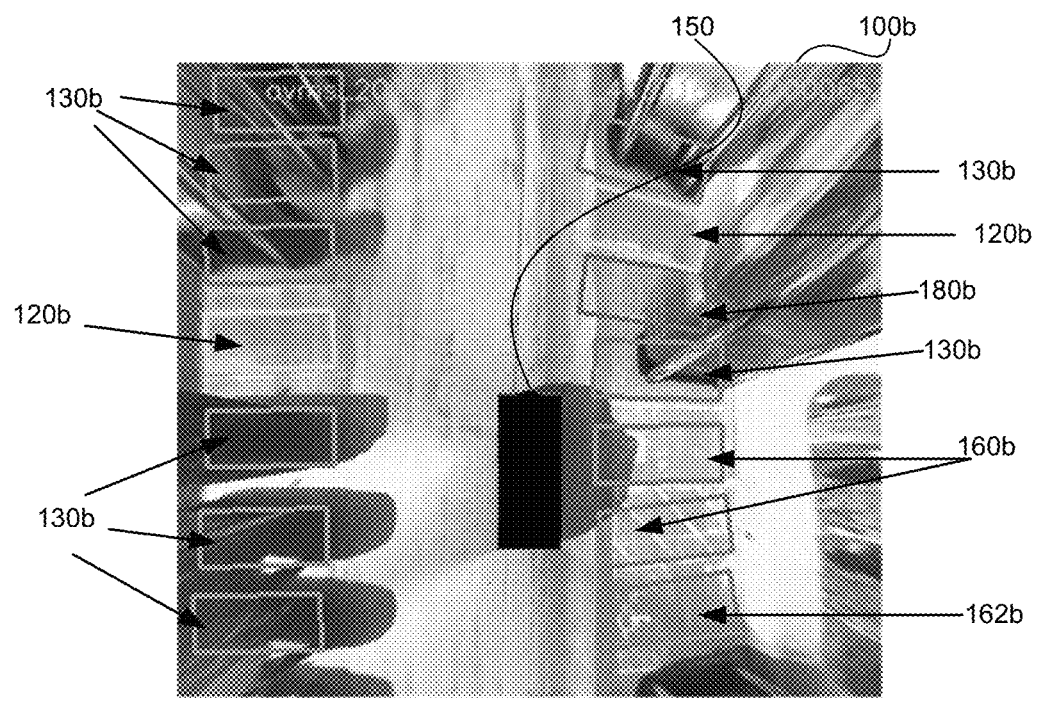

Referring now to FIG. 1B showing a schematic illustration of an exemplary top-down representation of a road segment with markings of classified parking slot objects thereon, in accordance with some exemplary embodiments of the disclosed subject matter.

Image 100*b* may be a schematic illustration of a top-down representation of the road segment represented in Image 100*a*, with markings of automatically-detected parking slots thereon. Image 100*b* may be generated based on analysis and processing of Image 100*a*, such as using computer vision techniques, AI models, or the like. It may be noted that Image 100*b* may be of the same dimension and resolution as Image 100*a*. Image 100*b* may be utilized to provide the driver, computerized or human, with a comprehensive and clear view of the car's surroundings, aiding in parking, maneuvering, and avoiding obstacles.

In some exemplary embodiments, Image 100*b* may comprise different rectangle markings placed on top of Image 100*a*, representing different types, classes or states of identified parking slots. Parking objects represented in Image 100*b* as 120*b*, may be markings of detected vacant parking slot marking, e.g., parking slots that are available for parking by the vehicle. Parking objects represented in Image 100*b* as 130*b* may be markings of occupied parking slots, e.g., parking slots in which other vehicles (such as 132*a*) are parking. It may be noted that each occupied Parking Objects 130*b* may be occupied with different types of vehicles, having different shapes, different sizes, different parking orientation, or the like, such as 4-wheel vehicle, 2-wheeled vehicle, or the like.

Additionally, or alternatively, parking objects represented in Image 100*b* as 160*b* may comprise markings of blocked parking slot marking, e.g., parking slots that are unavailable for the vehicle although not being occupied with a parking car. As an example, some of Parking Objects 160 may be considered blocked due to the presence of a pedestrian, or another obstacle, preventing access to the parking slot. As another example, Parking Objects 160*b* may be considered as blocked due to a gate preventing access thereto. As another example, parking slots may be marked as blocked in Image 100*b* due to legal constraints or limited access permissions preventing usage thereof by the vehicle of interest. It is noted that such parking slots, if examined using classical computer vision techniques, would likely be considered "vacant". As an example, Parking Object 162*b* may be marked as a blocked parking object, despite physically being vacant, due to disabled Sign 122*a* in front thereof, indicating that only vehicles with disabled permit are allowed to park therein. As the vehicle of interest does not have such permit, the parking slot is considered "blocked" for such vehicle. As can be appreciated, the "blocked" classification may be different for different vehicles, depending on their different access permissions and permits. Additionally, or alternatively, different combinations of classes with different definitions may be defined, based on visual characteristics, context, or the like.

Additionally, or alternatively, Image 100*b* may comprise markings of detected indistinct parking slot objects (180*b*), e.g., rectangles representing parking slots that are not classified as vacant, occupied or blocked. As an example, some parking objects may be identified as an indistinct parking object because of not being fully represented in Image 100*a*, e.g., portions thereof are missing from the representation. As another example, some parking objects ay be identified as an indistinct parking object because of being located in blind slop (110*a*) in Image 100*a*.

It may be noted that different visual markings may be utilized to mark the different classes of parking object, such as the use of bold line for marking vacant parking objects, the use of regular lines, dashed lines, dotted lines, or the like for other classes, or the like. Additional or alternative techniques may be utilized, such as for example marking different classes with different colors, adding visual signs on the rectangles representing the parking slots indicating their class, corners markings of the rectangles, or the like.

It is further noted that different parking slots have different orientations and they may not necessarily be parallel to one another. Each detected parking slot may be detected independently. In some cases, ambiguity is resolved by ensuring that different parking slots do not collide with one another. Hence, a classification of an "indistinct" parking slot may be useful for ensuring the sequence of parking slots is correctly maintained, including their respective orientations, as one parking slot's orientation might affect the possibility of its neighboring parking slots, as well as their respective non-overlapping positions.

Figure 2:
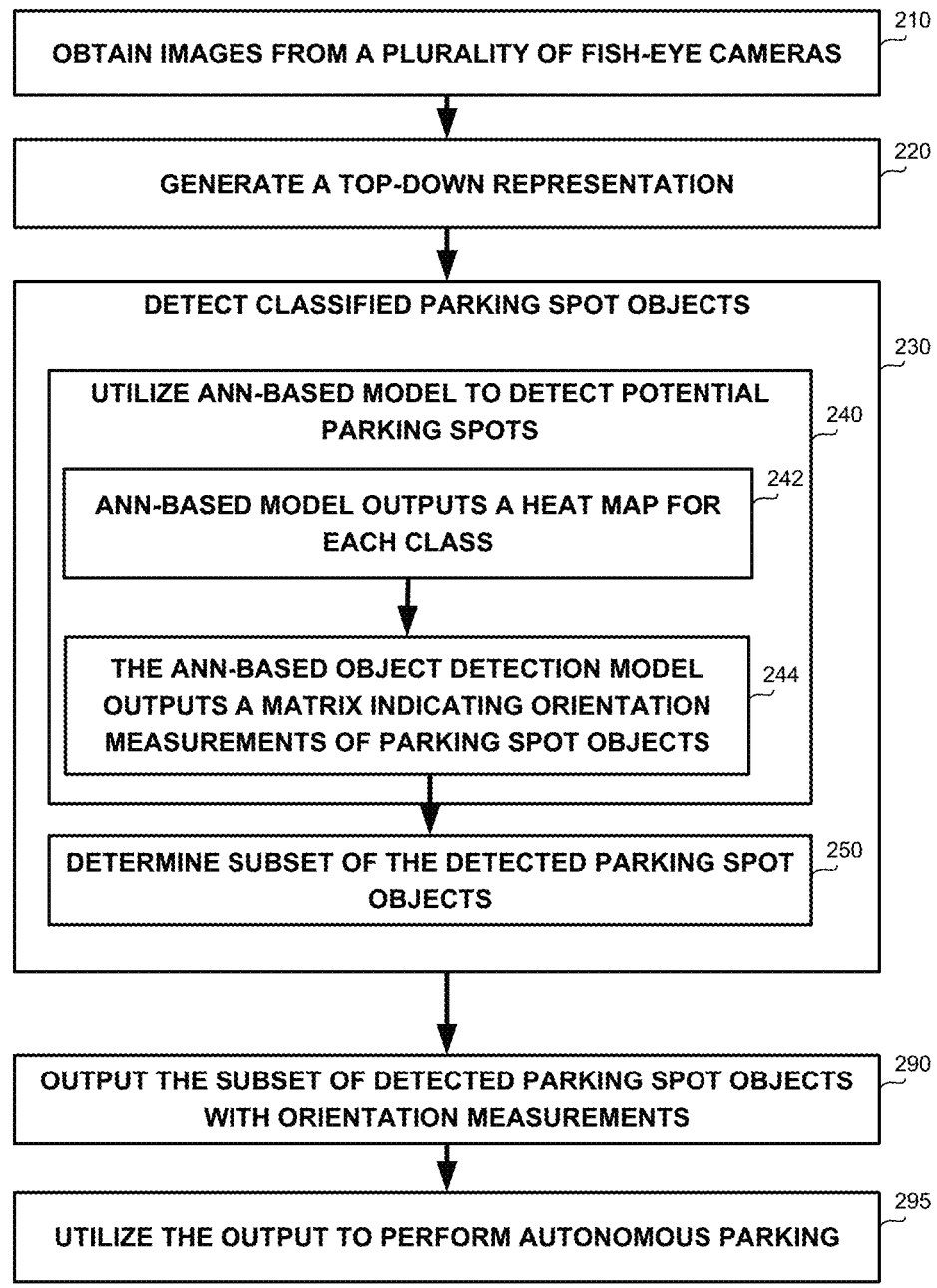
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

On Step 210, images may be obtained from a plurality of cameras that are mounted on a vehicle. In some exemplary embodiments, the cameras may be fish-eye cameras that are designed to provide wide angles of view. Fish-eye cameras may employ special mapping or visual distortion intended to create a wide panoramic or hemispherical image, which gives images a characteristic convex non-rectilinear appearance. Fish-eye cameras may have a field of view that approaches or exceeds 180 degrees, allowing them to capture a large area in a single frame. The focal length of fish-eye lenses may be short compared to standard vision sensors (at least 5 meters, and up to about 9 meters, 10 meters, or the like, from the center of the vehicle, from the wheel hinge of the vehicle, or the like), contributing to their wide-angle perspective.

In some exemplary embodiments, the plurality of fish-eye cameras may comprise at least a first camera that captures a front view of the vehicle, a second camera that captures a left view of the vehicle, a third camera that captures a right view of the vehicle, and a fourth camera that captures a back view of the vehicle. To achieve a 360-degree view of a vehicle, fish-eye cameras can be strategically placed in various locations. As an example, the front-view fish-eye camera may be mounted on the front bumper of the vehicle. The back-view fish-eye camera may be placed on the rear bumper, thereby providing a broad view of the area behind the vehicle. The fish-eye cameras providing the left and right views of the vehicles may be integrated into the side mirrors to cover blind spots on either side of the vehicle, near the fenders or quarter panels, in the wheel arches, or the like. As can be appreciated, the side fish-eye cameras may be mounted at a different height than the front and back-view cameras, e.g., at the height level of the mirrors as opposed to the height level of the bumpers. It is noted that the above is non-limiting examples only, any other combination of cameras providing a top-down view of the vehicle that ensures comprehensive coverage of the surrounding area without or with minimal blind spots may be utilized, while taking into account the height differences, if any, when determining the representation of the surrounding area. As an example, in some parking scenarios, a 360-degree view around the vehicle may be required to provide distinct results, while in other scenarios, partial coverage of only front and right views may be utilized, such as when the parking is allowed only on pre-defined areas or directions.

On Step 220, a top-down representation of a surrounding area around the vehicle may be generated using the images from the plurality of fish-eye cameras. The top-down representation may provide as a bird's-eye view; an aerial perspective or overhead of the environment surrounding the vehicle as if it were observed from above, looking down onto the surface. The top-down representation may be designed to capture and display all relevant information within a predefined area around the vehicle which is included in the field of view of the fish-eye cameras, offering an overview of the environment around the vehicle. Additionally, or alternatively, the top-down representation may be generated by integrating data from additional sensors in addition to the fish-eye cameras, such as LiDAR, radar, and other environmental sensors, to create a unified and informative view.

In some exemplary embodiments, in order to create an accurate representation, generating the top-down representation of the surrounding area around the vehicle may involve image stitching, distortion correction, projection, or the like. Generating the top-down representation may comprise excluding information that is captured by the plurality of fish-eye cameras regarding locations that are further to the vehicle over a pre-defined maximal threshold, such as further to 5-meters from the vehicle, further to 9-meters from the front and back of the vehicle, or the like. Additionally, or alternatively, information that is captured by the plurality of fish-eye cameras regarding the vehicle (e.g., partial view of the mirror, partial view of the bumper, or the like) may be excluded when stitching the images to focus on the most relevant information. Additional sensor fusion and image processing technologies may be employed to stitch together the views from these cameras and provide a seamless and coherent image of the vehicle's surroundings.

In some exemplary embodiments, the top-down representation of the surrounding area around the vehicle may be generated by an AVM system. The images captured by the fish-eye cameras undergo calibration to correct for lens distortions, ensuring that all images align accurately. Image stitching techniques may be employed to merge the views from the fish-eye cameras seamlessly. The stitched and calibrated images may then be combined to generate an AVM image capturing the immediate surroundings of the vehicle. The AVM image provides a clear and comprehensive view, including obstacles, lines on the road, and other relevant details. Additionally, or alternatively, other omni-view systems may be utilized to generate the top-down representation, based on input from wide-angle cameras having overlapping fields of view that collectively cover the whole area around the vehicle and serve as an omnidirectional (360-degree) camera. As an example, video from the cameras from four sides of the vehicle may be synthesized to a bird's-eye view from above the vehicle by stitching the video feeds together, correcting distortion, and transforming the perspective. Additionally, or alternatively, an AVM image may be created based on an input from a single camera, such as by stitching frames from different times, data from other sensors, or the like.

It may be noted that other types of visual inputs may be utilized instead or in addition to or instead of the fish-eye images, and other types of representations may be generated. The generation process of the required representation of the surrounding area around the vehicle may depend on the types of the visual input. As an example, ultrasonic sensors are used in combination with the omni-view system to provide distance information and highlight the relevant view that may be affected by potential obstacles.

On Step 230, detection of classified parking slot objects in the top-down representation of the surrounding area around the vehicle may be performed. In some exemplary embodiments, the parking slots from each class, may be detected as objects, having a shape, a center, boarder, or the like. As an example, a vacant parking slot object may be a conceptual object that has no physical material above the road surface, having a rectangle shape in a size of the vehicle, of void above the road, where the vehicle can be parked. A vacant parking slot is defined by a lack of something—a lack of a vehicle in an area suitable for parking. The vacant parking slot's center is in fact an area that has no unique identifying information. Instead, it is many times identified by the boundaries (e.g., on-surface markings) or by its surrounding (e.g., other vehicles being parked, which may define ad-hoc sequences of parking slots). It is noted that other parking slots object are also conceptual, such as an occupied parking slot object, a blocked parking slot object, or the like. In some exemplary embodiments, one class of parking slot objects may cover multiple types or situations of parking objects. As an example, certain situations of visually "vacant" parking slots may be classified as blocked or occupied, such as reserved parking slots, disabled parking slots, or the like. Such parking object may be classified as a "blocked" parking slot object, despite the absence of any physical object blocking thereof. Additionally, or alternatively, the same parking slot object may be classified as "vacant" for one vehicle or user (such as for a driver authorized to park in disabled parking) and as "blocked" in other scenarios, such as for general vehicles.

Additionally, or alternatively, the parking slot object may not be classifiable to any of the classes of vacant, occupied, blocked, or the like, such as due to ambiguities, uncertainties, or the like. A class of indistinct parking slot objects may be utilized to classify parking slot objects that are not classified as vacant, occupied, or blocked. Additionally, or alternatively, additional classifications or other combinations of classes may be utilized.

Additionally, or alternatively, additional classes of blocking objects may be utilized to classify the parking spots, such as by dividing "blocked" class into two more classes of potential blocking objects: dynamic objects (e.g., pedestrians) and static objects. In some cases, these sub-classes may be auxiliary classes that may not be outputted in the final output. The auxiliary classes may be utilized to direct the network to learn the features that differentiate one class (e.g., a "blocked" parking spot) from other classes (e.g., "vacant", "occupied", "indistinct" parking spots).

In some exemplary embodiments, the detection of parking slot objects may be performed without relying on pre-defined on-surface markings that define the boundaries of parking slot objects in which vehicles are allowed to park.

It is noted that in ad-hoc parking areas, no such markings exist, and the relative location of other vehicles may temporarily define potential parking slots in the area. In fact, in some cases, a vehicle performing "double parking", partially occupying two adjacent marked parking slots, may create an ad-hoc parking slots that are identifiable by the disclosed subject matter. The disclosed subject matter may identify the ad-hoc parking slots that contradict the on-surface markings due to the doubled-parked vehicle, and may allow the autonomous driver to park in contradiction of the on-surface marking, but in a similar manner to a way that a human driver would park.

On Step 240, an ANN-based object detection model may be utilized to detect potential parking slot objects in the surrounding area around the vehicle. The ANN-based object detection model may be specifically trained for detecting parking slot objects, on a dataset that includes various parking slot scenarios. The ANN-based object detection model may be configured to detect classification and exact position of potential parking slot objects.

In some exemplary embodiments, the ANN-based object model may be trained to identify a plurality of parking slot objects from different classes. Such as vacant parking slot objects, blocked parking slot objects, occupied parking slot objects, and indistinct parking slot objects. An example of an architecture of the ANN-based object model may be CenterNet. CenterNet may be configured to predict a bounding box of the parking slot object and its center point simultaneously, in real-time. CenterNet may be configured to model each parking slot as a single point, the center point of its bounding box, and utilizes key point estimations to find center points and regresses to all other object properties, such as size, location, orientation, pose or the like.

On Step 242, the ANN-based object detection model may be configured to output a heat-map for each class of parking slot objects. A heat-map may be an intensity map of detected objects or features in an image. In the context of parking slot detection ANN-based object detection model, these heat-maps may indicate the confidence of the ANN-based object detection model in identifying parking slot objects of a specific class. The higher the intensity in a certain pixel of the heat-map, the higher the model's confidence that there is a center of a parking slot of that class in the pixel's location. The intensity of the color in a heat-map indicates the model's confidence level. Higher intensity (brighter color) signifies higher confidence in the detection of a parking slot object of a specific class, while lower intensity (darker color) suggests lower confidence.

The ANN-based model is configured to output heat maps indicating the confidence of the model in detecting different classes of parking slot objects. Separate heat-maps may be produced for each class of parking slot objects, or any other auxiliary classes, if exist. Assuming parking slot objects are classified into one of the above mentioned 4 classes: vacant, blocked, occupied, and indistinct, the ANN-based detection model may be configured to output at least 4 heat maps: a first heat-map, indicating a confidence of the ANN-based object detection model of a detection of the vacant parking slot object, a second heat-map indicating a confidence of the ANN-based object detection model of a detection of the occupied parking slot object, a third heat-map indicating a confidence of the ANN-based object detection model of a detection of the blocked parking slot object, and a fourth heat-map indicating a confidence of the ANN-based object detection model of a detection of the indistinct parking slot object. This allows for a detailed analysis of the confidence in detecting different types of parking slots. All the heat-maps may be of the same predetermined dimension H×W with each pixel corresponding to a specific region in the input image. The size of the heat-maps corresponds to the spatial dimensions of the input image or a feature map generated by the network. Each pixel in the heat-map corresponds to a specific region in the image, and the intensity of that pixel represents the confidence score for the presence of a parking slot object of a particular class. As an example the size of the heat-maps 32×32, 36×32, 100×120, or the like. The size of the heat-maps may be determined by the resolution of the feature map at the output layer of the neural network.

In some exemplary embodiments, each of the heat-maps indicates for each pixel thereof, a probability that corresponding pixel in the original image represents a center of a parking slot object of a specific class. The higher the probability at a given pixel, the more likely it is that the pixel is the center of a parking slot of the corresponding class. As an example, the probabilities can range from 0 to 1, where 0 indicates no likelihood, and 1 indicates a definitive certainty. Higher probabilities suggest a higher likelihood that the corresponding pixel is the center of a parking slot from certain class. Heatmaps are not mutually exclusive-they can store high probability for more than a single class in the very same pixel.

In some exemplary embodiments, a local search of a maximal probability value within a heat-map may be performed to identify a candidate of a center point of a parking slot object within the heat-map. The local search may involve finding the pixel with the maximal probability within a local area of the heat-map, to be considered a candidate for the center of a parking slot object. Once the pixel with the maximal probability is identified, it may be set as a candidate center point for a parking slot object, and used for determining the location of the detected object in the original image. The precision of this localization process depends on the resolution of the heat-maps and the accuracy of the probability values assigned by the model. The process may be performed for each class-specific heat-map, allowing the model to identify multiple candidates for different types of parking slot objects in the image.

On Step 244, the ANN-based object detection model may be configured to output a matrix that provides information about the orientation of detected parking slot objects. Such information may comprise an angle of the parking slot object with respect to a reference axis, an offset associated with the center localization accuracy, size of the parking slot (e.g., height, width, or the like), or the like. The matrix may be of the same size (dimensions) as the heat-maps (H×W). The matrix may include orientation information for each cell where the center of a parking slot object is located (e.g., indicating, in each cell, an orientation of a parking slot object that has a center at the respective cell). The information from the matrix may be used to determine geometric information of the parking slot, such as the angle, width, and height of each detected parking slot object. The geometric information may be crucial for accurately representing the parking slots in the top-down view and assessment of the error in down sampling, to improve the center localization accuracy.

It may be noted that the information in each cell of the matrix is applicable to each respective cell of each class-specific heat-map. As an example, assuming the ANN-based object detection model outputting a first detected parking slot object and a second detected parking slot, in the same pixel from different classes, a single angle measurement that may be applicable to both the first detected parking slot object and the second detected parking slot object may be defined. The orientation characteristics of a parking slot object in a specific location, may be set regardless of the class of the parking slot object.

On Step 250, a subset of the plurality of detected parking slot objects may be determined.

In some exemplary embodiments, the subset of detected parking slot objects may be determined in accordance with predetermined implemented collision rules. The rules may be utilized to refine the set of detected parking slot objects to avoid ambiguity and improve the accuracy of the parking slot detection system. The rules may define when to remove parking slot objects of one class that collide with those of another class to avoid ambiguity, in accordance with the confidence level of the parking slot being of the respective class in each cell. It may be noted that the rules and conditions for collision avoidance may vary based on the system requirements, the context of use, the desired behavior of the parking assistance system, or the like.

As an example, one rule may be to prioritize parking slot objects based on confidence levels. When there is a collision or overlap between detected parking slot objects of different classes, the class with the higher confidence level as indicated in the heat map probabilities may be prioritized. As another example, another rule may be to prioritize vacant classification of parking slot objects, only when the confidence level thereof is above a predetermined threshold, such as above 75%, above 80%, or the like. By setting a confidence threshold, the system ensures that only highly reliable vacant parking slot detections influence the decision-making process. This helps mitigate the risk of false positives in identifying available parking spaces. The rule is designed to balance the importance of accuracy in identifying vacant slots with the potential consequences of incorrect classifications. If the confidence level is below the threshold, the system may prioritize other classes or employ additional safety measures to avoid relying on less certain vacant slot detections. Other rules prioritizing between classes may be utilized given similar or close confidence level, such as prioritizing "blocked" over "occupied", prioritizing "vacant" over "blocked" only if a predetermined condition is met, or the like. As yet another example, the rule may be to remove or disregard a detected parking slot object if the confidence level thereof is below a certain threshold. Low confidence in the detection of a parking slot may lead to inaccurate results. By setting a confidence threshold, the system can filter out less reliable detections, reducing the chances of false positives or misleading guidance.

Additionally, or alternatively, a rule may be to prioritize indistinct parking slot object classification in ambiguous situations. In scenarios where the system cannot clearly determine whether a parking slot is vacant, blocked, or occupied, giving priority to the indistinct class helps avoid potentially misleading guidance. This rule acknowledges the uncertainty in classifying parking slots and aims to provide a conservative approach. Prioritizing indistinct parking slots can be particularly useful in situations where visual ambiguity or environmental conditions make it challenging to confidently classify parking spaces. By focusing on indistinct slots, the system emphasizes caution and reduces the likelihood of guiding the driver to a parking slot that may not be accurately classified. This rule contributes to a more conservative and safety-conscious parking assistance system.

Additionally, or alternatively, other post-processing techniques may be applied to refine the detected parking slots. This may involve filtering out false positives, adjusting the positions based on the matrix information, and handling overlapping or conflicting detections.

It is noted that in some embodiment, a single 3D heat map may be utilized to represent the multiple 2D heat maps, by utilizing the third dimension to indicate to different classes. It is noted that the local search process may be performed in each Z dimension irrespective of the other, and collision rules and subset determination may be performed independently thereafter (e.g., in Step 250). Additionally, or alternatively, the local search may take into account adjacent information regarding other classes, and apply collision rules, indicating which value is considered "higher" for the purpose of such local search (e.g., biasing specific classes over others, even when their respective confidence measurements are lower). In such an embodiment, the local search may inherently also implement Step 250.

On Step 290, the subset of the plurality of detected parking slot objects with corresponding orientation measurements thereof may be outputted.

In some exemplary embodiments, the final output of the detection process may be a refined set of detected parking slot objects, along with their respective angles, ready to be marked on the top-down representation. In some exemplary embodiments, a graphical display of parking slots and their respective classes within the surrounding area around the vehicle may be displayed to a human driver for autonomous parking applications. The graphical display may be in top-down representation generated based or on the top of the top-down representation of the surrounding area around the vehicle generated in Step 220. An in-vehicle display (e.g., vehicle's dashboard display, infotainment system, or the like) may be utilized to display the graphical display, providing to the driver real-time information about available parking slots and their characteristics.

On Step 295, the output may be utilized by an autonomous driver of the vehicle, to park the vehicle in a parking slot without human intervention. The information generated through the detection process serves as input for the autonomous driving system to make decisions on maneuvering and parking the vehicle safely.

Figure 3:
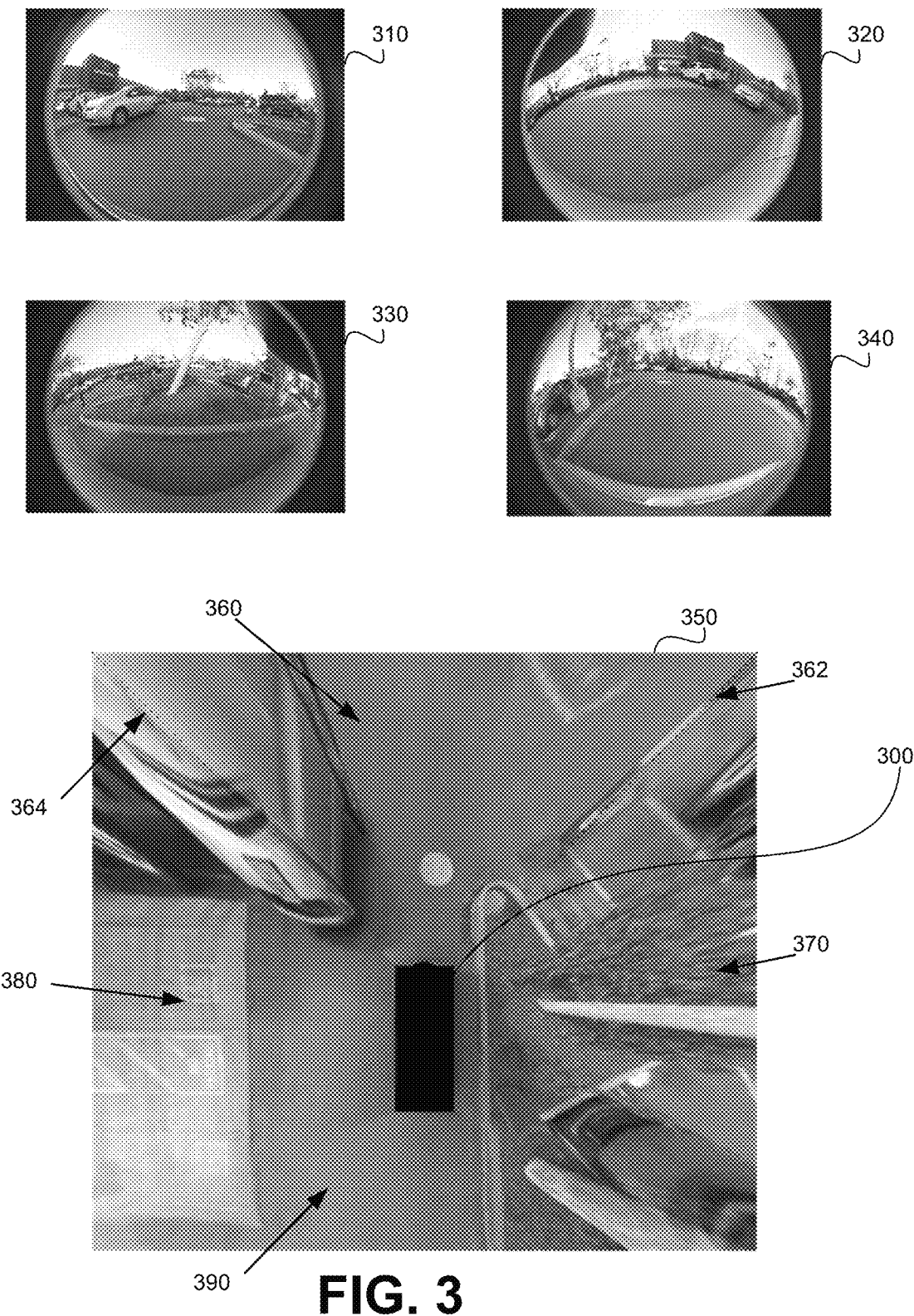
FIG. 3 shows a schematic illustration of exemplary top-down representation generated based on fish-eye images, in accordance with some exemplary embodiments of the disclosed subject matter.

Referring now to FIG. 3 showing schematic illustration of exemplary top-down representation generated based on fish-eye images, in accordance with some exemplary embodiments of the disclosed subject matter.

Image 350 may be a top-down representation of a surrounding area around a vehicle. Image 350 may serve as an AVM, offering a comprehensive perspective of the environment surrounding a vehicle. Within Image 350, the vehicle itself, represented as Vehicle 300, is strategically positioned, typically at the center, bottom center, or a similar location.

In some exemplary embodiments, Image 350 may be generated based on combining images from multiple cameras mounted on the vehicle. As an example, Image 350 may be generated based on input from fish-eye images capturing at least a portion of the environment surrounding the vehicle.

As an example, Image 310 captures the front view; Image 320 captures the left side view; Image 330 captures the right-side view; and Image 340 captures the back (also referred to as rear) view: The multiple fish-eye cameras may collectively cover a 360-degree field of view around the vehicle, ensuring a holistic representation of the surroundings. Additionally, or alternatively, the multiple fish-eye cameras may collectively cover a field of view of less than 360-degree around the vehicle, such as because of not covering some portions of the environment around the vehicle, blind spots, biasing to the area in front of the vehicle, e.g., covering 280-degree field of view excluding the area behind the vehicle, or the like.

In some exemplary embodiments, Image 350 may be generated by an AVM system of the vehicle, or an AVM system that utilizes a set of cameras strategically placed on the vehicle, that capture images from different perspectives, such as the front, rear, left, and right sides. The number and placement of cameras can vary, depending on the required coverage of view, such as covering a 360-degree field of view around the vehicle. Each of Images 310-340 may be captured by an individual camera.

In some exemplary embodiments, Images 310, 320, 330 and 340 may be fish-eye images, e.g., images with a strong visual distortion intended to create a wide panoramic or hemispherical image. Accordingly, the informative pixels in Images 310, 320, 330 and 340 may appear in circular shape therein. Each of fish-eye Images 310, 320, 330 and 340 may capture an extremely wide angles of view, well beyond any regular image or images with straight lines of perspective. The angle of view of a fish-eye lens may usually be between 100 and 180 degrees. However, Images 310-340 may be generated using lenses covering up to 280 degrees exist, enabling a wider focal length. In some cases Images 310, 320, 330 and 340 may be generated using an intended distortion, such as equisolid angle, which gives images a characteristic convex non-rectilinear appearance.

In some exemplary embodiments, Image 350 may be generated using advanced computer vision algorithms that are employed to stitch together the individual fish-eye images (Image 310-Image 340). Images 310, 320, 330 and 340 may be stitched seamlessly in an image stitching that aligns the overlapping regions of adjacent images, creating a cohesive and continuous representation of the entire surroundings. The AVM system may employ calibration techniques to ensure accurate alignment and representation of distances in Image 350, and creating a distortion-free and realistic portrayal of the environment. Such techniques may offer a tailored and informative top-down perspective of the vehicle's surroundings, with customizable front-view specifications and exclusion criteria for optimal clarity and relevance. This synthesis process may be configured to ensure a seamless and coherent top-down representation, enabling a comprehensive understanding of the vehicle's surroundings.

The top-down representation within Image 350 may be designed to provide specific front-view perspectives. In some exemplary embodiments, one configuration of the fish-eye cameras may guarantee a minimum of a 5-meter view of the vehicle, ensuring that potential obstacles or relevant information within this range are captured and displayed, such as in Rear Region 390, Left Region 350 and Right Region 370. Additionally, or alternatively, alternate configuration may offer a more extensive front-view; providing at least an 8-meter visibility range, such as in Front Region 360 of Image 350. This flexibility allows for adaptation to different driving scenarios and preferences. Strategic placement, calibration, and appropriate camera specifications may be selected to ensure the required minimum front-view distance and the flexibility for an extended view when required. In some cases, the multiple cameras may be located over the vehicle and calibrated accordingly. As an example, a forward-facing fish-eye camera may be positioned at the front of the vehicle at a center thereof to capture the immediate surroundings. Additional fish-eye cameras with wider fields of view; placed slightly to the sides of the central front camera. Additionally, or alternatively, parameters of the fish-eye cameras may be set and calibrated to ensure smooth stitching of Images 310-340 into Image 350, such as the Field of View (FOV) of the cameras, resolution, frame height and width, chess board height and width, light performance, distortion focal and size scale, or the like. As an example, fish-eye cameras with a wide-angle field of view may be utilized to maximize the coverage. The FOV of each camera may be calibrated to accurately represent distances in the captured images. As another example, the resolution of the cameras may be set in a manner ensuring the required visibility range. Higher resolution in the cameras enables capturing more details, enhancing the system's ability to detect and represent objects accurately.

In some exemplary embodiments, some information from Images 340-340, such as noisy or irrelevant information, may be filtered during generating the top-down representation in Image 350. As an example, details captured by the fish-eye cameras that pertain to locations beyond a predefined maximal threshold may be excluded. In one embodiment, this threshold may be set at a minimum of 5 meters from the vehicle, ensuring that only immediate surroundings are considered. As another example, information related to the vehicle itself (such as pixels associated with the vehicle) may be excluded or reduced. The exclusion may ensure that the representation is focused on the external environment, enhancing clarity and relevance for the driver or autonomous system utilizing the AVM. Additionally, or alternatively, overlapping regions of Images 310-340 may be eliminated to seamlessly stitch the images. This helps in creating a continuous and coherent representation. Additionally, or alternatively, some details of the surrounding area of the vehicle may be missing from Images 340-340. As an example, locations at the boarders of the FOV of the fish-eye lenses, location below the vehicle, or the like.

In some exemplary embodiments, each portion (e.g., per pixels) in Image 350 may be generated based on a combination of information from different images of Image 310-340. As an example, Region 362 connecting between Front Region 360 and Right Region 370 may be generated based on both of Image 310 capturing the front view if the vehicle and Image 330 capturing the right view, and Region 364 is generated based on combination of Image 310 and Image 320 capturing the left view: In some cases, different weights may be assigned for different contributing images when creating the AVM image. As an example, a higher weight may be assigned for Image 310 capturing the front view when determining Region 360, than Images 330 and 320, which may be assigned with higher weights when being closer to Regions 362 and 364, respectively.

In some exemplary embodiments, masking, or selective application may be performed on Images 310-340 in the stitching process to provide for a smooth realistic connection between the different regions of Image 350. The goal of the masking may be to generate an image that closely resembles a real perspective of a top-down view from above the vehicle. By such masking, portions of the respective fish-eye image may be excluded during the stitching process. As an example, a binary mask that defines the regions of interest or importance within Images 310-340 may be utilized to indicate which areas should contribute to Image 350 and which areas should be ignored or de-emphasized. Additionally, or alternatively, masking may be performed for blending and creating smooth transitions between Regions 360, 380, 370 and 390 generated mainly based on Image 310, 320, 330 and 340, respectively. Additionally, or alternatively, masking may be applied to correct distortions or imperfections in specific areas of Images 310-340. For example, if a certain camera has more distortion in its fish-eye lens, a mask can be used to minimize its impact on the final stitched image (350).

Figure 4:
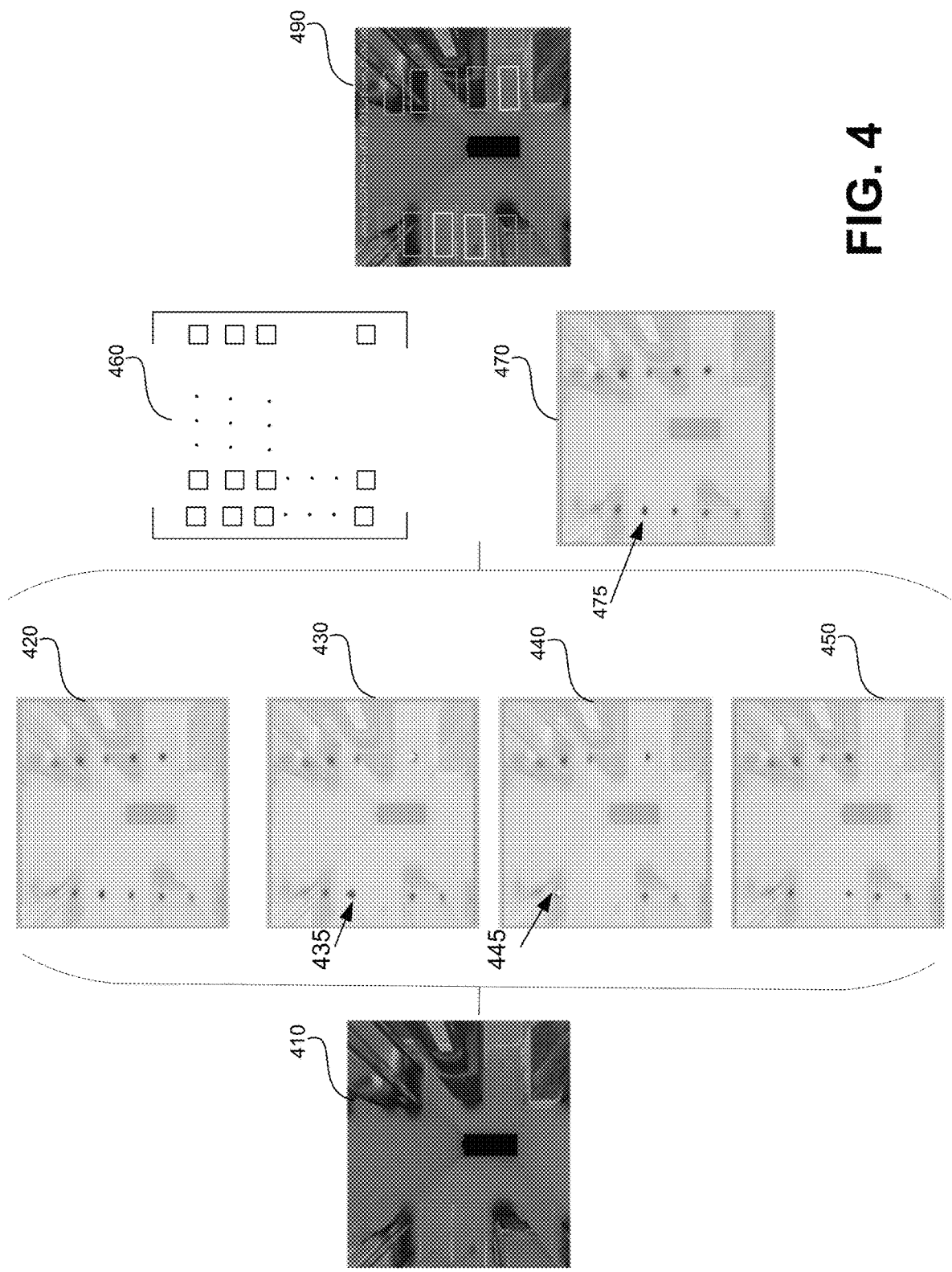
FIG. 4 shows a schematic illustration of an exemplary parking slot detection scheme, in accordance with some exemplary embodiments of the disclosed subject matter.

Referring now to FIG. 4 showing a schematic illustration of an exemplary parking slot detection scheme, in accordance with some exemplary embodiments of the disclosed subject matter.

In some exemplary embodiments, a top-down representation, such as an AVM Image 410 of a surrounding area around a vehicle may be inputted to an ANN-based object detection model, to perform parking slot detection thereon. AVM Image 410 may be a top-down image generated based on combining images from a plurality of fish-eye cameras that are mounted on the vehicle, such as depicted in FIG. 3. ANN-based object detection model may be configured to output a version of AVM Image 410, (e.g., Image 490) with a plurality of detected parking slot objects marked therein, such as in FIG. 1B generated based on FIG. 1B. Image 490 may be displayed to a human driver a graphical display of parking slots and their respective classes within the surrounding area around the vehicle. Image 490 may be used for autonomous parking, providing essential information for the vehicle's parking maneuver In some exemplary embodiments, ANN-based object detection model may be a computer vision model designed for object detection tasks, such as, but not limited to CenterNet. The ANN-based object detection model may be trained to identify parking lot objects by identifying a center or other key-points thereof, such as corners, edges, or the like, instead of identifying the entire rectangle or region defining the parking slot. ANN-based object detection model may be configured to evaluate, for each pixel in the input image, how likely this pixel can be a center of a parking slot object.

In some exemplary embodiments, the ANN-based object detection model may be configured to output a first Heat-Map 420 indicating a confidence of the ANN-based object detection model of a detection of vacant parking slot objects in AVM Image 410. The ANN-based object detection model may be configured to further output a second Heat-Map 430 indicating a confidence of the ANN-based object detection model of a detection of occupied parking slot objects in AVM Image 410. The ANN-based object detection model may be configured to further output a third Heat-Map 440 indicating a confidence of the ANN-based object detection model of a detection of blocked parking slot objects in AVM Image 410. The ANN-based object detection model may be further configured to output a fourth Heat-Map 450 indicating a confidence of the ANN-based object detection model of a detection of indistinct parking slot objects in AVM Image 410. Additionally, or alternatively, the ANN-based object detection model may be configured to output additional heat-maps (not-shown), in accordance with the number of classes of parking slot objects, each of which indicating a confidence of the ANN-based object detection model of a detection parking slot objects from the respective class.

In some exemplary embodiments, each pixel in Heat-Maps 420-450 may be configured to indicate the probability of representing the center of a parking slot object, belonging to the specific class. Utilizing the ANN-based model may involve a local search for the maximal predetermined number (k) probability values within each of Heat-Maps 420-450, to identify candidate center points for k parking slot object. The 955 predetermined number of parking spot objects in each heatmap, may be determined relatively based on properties of the parking area represented in the input image, such as size, vacuity, or the like. The predetermined number of parking spot objects in a heatmap representing an area of 20*30 meters, may be about 20, about 10, or the like. The local search operation can be visualized as a targeted examination within the probability distribution of each heat map. This process seeks the pixel with the highest probability value, signifying the most probable location for the center of a parking slot object within the given class. The search is performed independently for each heatmap associated with vacant, occupied, blocked, and indistinct parking slot objects. In some exemplary embodiments, the local search process performed by the ANN model may focus on identifying blobs representing areas with the highest likelihood of object presence. The pixel with the maximum probability in each blob may be selected as the center of the parking spot object.

In some exemplary embodiments, collision rules may be applied during the determination of a subset of detected parking slot objects, excluding conflicting objects based on class associations and probability values. An aggregated Heatmap 470 may be generated according to the collision rules, with parking object centers from different classes The collision rules may be based on criteria or guidelines used to determine the classification of a detected parking object when there is an overlap or intersection between objects of different classes, an ambiguity that arise when pixels in an image or heatmap could be classified as belonging to more than one class of parking objects, or the like. As an example, the occupied parking object centered at 435 in Heatmap 430 may intersect with the blocked parking object centered at 445 in Heatmap 440. Such intersection means that the respective pixels can be classified either as occupied or as blocked, but not as both. It is noted that the collision occurs even though pixels 435 and 445 may not be at the same (X,Y) position, but due to their respective parking slots overlapping. The collision rules may be based on confidence level, representing the system's certainty or probability of the object belonging to that class. As an example, the classification with the higher confidence level may be selected. As another example, the rule may involve setting confidence thresholds. If the confidence level of a class is below a certain threshold, the system may prioritize another class or take additional safety measures. Additionally, or alternatively, the collision rules may leverage confidence levels and predefined rules to ensure accurate and reliable identification in complex scenarios. As an example, rules may prioritize one class over another based on predetermined conditions or importance, e.g., prioritizing "blocked" over "occupied" when the confidence levels are within predetermined value regions. The specific collision rules may be adapted based on system requirements, the context of use, and the desired behavior of the parking assistance system. This adaptability allows the system to handle various scenarios effectively. Additionally, or alternatively, some collision rules may adopt a conservative approach, favoring more cautious decisions in ambiguous situations such as prioritizing an indistinct class when there is uncertainty. Additionally, or alternatively, the rules may include safety measures, such as disregarding a detected parking object if its confidence level falls below a certain threshold.

Additionally, or alternatively, the ANN-based object detection model may be configured to output a Matrix 460, with dimensions respective to the size of each of Heatmaps 420-450. Each cell in Matrix 460 may comprise an indication of an angle of a parking slot object that has a center at the respective cell. Additionally, or alternatively, each cell may comprise additional information associated with the parking slot object, such as offset values, a value indicative of a measurement of the parking object, e.g., width, height, size, coordinates, angles, dimensions, predicted categories, and confidence scores or the like.

In some exemplary embodiments, Image 490 may be created based on Image 410, Heatmap 470 and Matrix 460. Image 490 may be configured to feature different markings (such as using different colors, or different lines) to distinguish between various classes of parking slots, providing a comprehensive and user-friendly representation for the driver.

Figure 5:
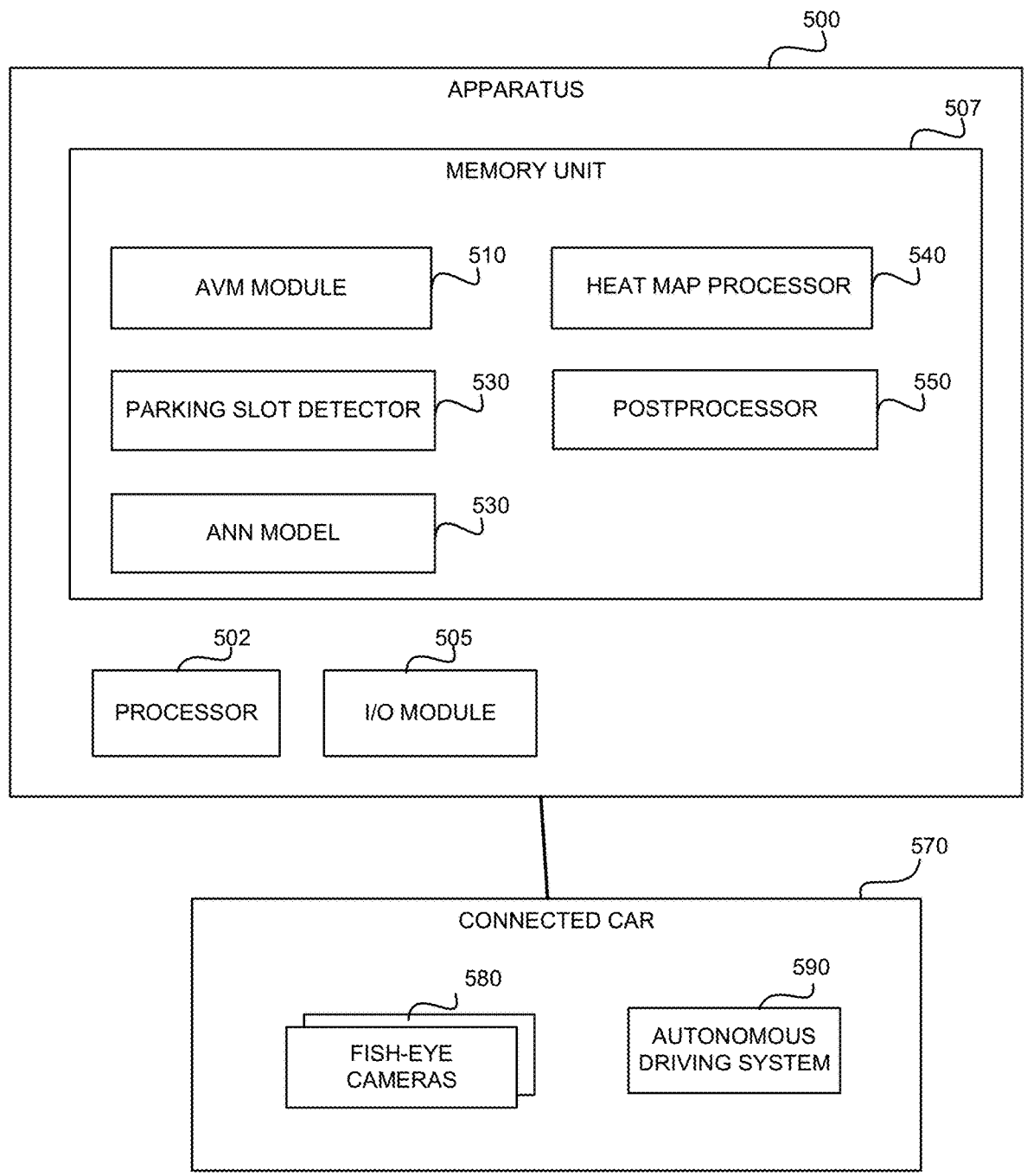
FIG. 5 shows a block diagram of apparatuses, in accordance with some exemplary embodiments of the disclosed subject matter.

Referring now to FIG. 5 showing a block diagram of an apparatuses, in accordance with some exemplary embodiments of the disclosed subject matter.

An Apparatus 500 may be configured to support parking slot detection, in accordance with the disclosed subject matter. In some exemplary embodiments, Apparatus 500 may comprise one or more Processor(s) 502. Processor 502 may be a Central Processing Unit (CPU), a microprocessor, an electronic circuit, an Integrated Circuit (IC) or the like.

Processor 502 may be utilized to perform computations required by Apparatus 400 or any of its subcomponents.

In some exemplary embodiments of the disclosed subject matter, Apparatus 500 may comprise an Input/Output (I/O) module 505. I/O Module 505 may be utilized to provide an output to and receive input from a user, a device, a sensor, a vehicle, or the like, such as, for example receiving an input from one or more sensors of Connected Car 570, providing output for one or systems of Connected Cars 570, or the like.

In some exemplary embodiments, Apparatus 500 may comprise Memory 507. Memory 507 may be a hard disk drive, a Flash disk, a Random-Access Memory (RAM), a memory chip, or the like. In some exemplary embodiments, Memory 507 may retain program code operative to cause Processor 502 to perform acts associated with any of the subcomponents of Apparatus 500.

In some exemplary embodiments, Connected Car 570 may comprise one or more Fish-eye Camera(s) 580. Fish-eye Camera(s) 580 may be configured to capture fish-eye images of the area surrounding Connected Car 570. Fish-eye Camera(s) 580 may be configured to cover a 360 degrees field of view around the Connected Car 570. As an example, Fish-eye Camera(s) 580 may comprise at least a first camera capturing a front view of Connected Car 570, a second camera capturing a left view of Connected Car 570, a third camera capturing a right view of Connected Car 570 and a fourth camera capturing a back view of Connected Car 570. Additionally, or alternatively, Connected Car 570 may comprise additional sensors (not shown), such as a digital camera, a thermal infra-red camera, Red Green Blue (RGB) modeling sensor, a Light Detection And Ranging (LiDAR), a smart camera device, a network of spatially distributed smart camera devices, a sonographer, Magnetic resonance imaging (MRI) sensor, a combination thereof, or the like.

In some exemplary embodiments, AVM Module 510 may be configured to generate a top-down representation of the surrounding area around a vehicle, such as Connected Car 570, by combining images from a plurality fish-eye cameras that are mounted on the vehicle, such as Fish-eye Camera(s) 580. AVM Module 510 may be configured to correct inherent distortion of the output of Fish-eye Camera(s) 580, perform geometrical transformation to project and stitch images from Fish-eye Camera(s) 580 into a single image, such as Image 100a in FIG. 1A, Image 350 in FIG. 3, Image 410 in FIG. 4, or the like.

In some exemplary embodiments, Parking Slot Detector 520 may be configured to perform detection of parking slot objects within the top-down representation of the vehicle's surroundings created by AVM Module 510, and classify them into vacant, blocked, occupied and indistinct parking slot objects. Parking Slot Detector 520 may be configured to employ an ANN Model 530 trained for parking slot detection. ANN Model 530 may be configured to generate a heat-map for each class of parking slot objects, indicating a confidence of ANN Model 530 of a detecting parking slot object from the respective class. ANN Model 530 may be configured to produce four essential outputs: a first heat-map for vacant parking slots, a second heat-map for occupied slots, a third heat-map for blocked slots, and a fourth heat-map for indistinct slots. A higher value in a heatmap pixel indicates a higher probability of it being the center of a parking slot object.

In addition to heatmaps, the ANN Model 530 be configured to generate a matrix, indicating orientation information for each detected parking slot object. The orientation matrix may be of the same dimension as the heat maps. Each cell in the matrix may represent information associated with the parking object which it's center is located at (x,y) in the heatmaps. The orientation information comprises details of the parking spot object which the center thereof is located in the respective pixel in the heatmaps such as angle, offset, height, width, or the like.

Additionally, ANN Model 530 may be configured to generate a matrix indicating orientation information of each parking slot object identified in the heatmaps, such as angle, offset, height, width, or the like. The orientation matrix enhances the understanding of the spatial characteristics of detected parking slots, contributing to a comprehensive and effective parking assistance system.

Parking Slot Detector 520 may utilize Heat-Map Processor 540 to analyze and process the output of ANN Model 530, and select therefrom a predetermined number of detected parking slot objects. In some exemplary embodiments, Heat-Map Processor 540 may be configured to analyze each heatmap separately along with the matrix, to determine a predetermined of centers of parking objects from the class associated with the heatmap. In some exemplary embodiments, Heat-Map Processor 540 may select the predetermined number of highest-energy blobs or regions in each heatmap, that represent potential centers of parking slot objects. For each blob, Heat-Map Processor 540 identifies the pixel with the highest energy as the center of the parking slot object.

Parking Slot Detector 520 may be configured to processes the refined information provided by Heat-Map Processor 540, and select a subset of parking slot objects is determined for output. Parking Slot Detector 520 may be configured to ensure a coherent and collision-free set of detected parking slot objects. Parking Slot Detector 520 may utilize the generated matrix to determine for, each object of the set of parking slot objects, its oriented location with the AVM image based on the information provided in the respective cell in the matrix.

In some exemplary embodiments, Parking Slot Detector 520 may be configured to resolve collisions between different classes when determining the subset of the detected parking slot objects. Parking Slot Detector 520 may be configured to apply rule-based selection in accordance with predefined collusion rule between classes. In some exemplary embodiments, additional processing may be performed by Parking Slot Detector 520 in order to determine for each selected parking object, additional required data, such as coordinates, angle, height and width, predicted confidence level, or the like.

In some exemplary embodiments, Post-Processor 550 may be configured to process the output of Parking Slot Detector 520. Post-Processor 550 may be configured to integrate the selected parking objects with additional information, such as information from previous frames detections to enhance the current, additional information from various object detection modules found in the perception stage, or the like. In some cases, Post-Processor 550 may be configured to modify, if needed, the parking spot state (e.g., classification), past detection output, or the like. Additionally, or alternatively, Post-Processor 550 may be configured to correct current prediction according to previously identified states, resulting in a stable and more accurate result.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate array's (FPGA), or programmable logic array's (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for parking slot detection, the method comprising:

obtaining a top-down representation of a surrounding area around a vehicle, the top-down representation is generated based on one or more images from one or more cameras that are mounted on the vehicle;

performing a detection of a plurality of parking slot objects in the top-down representation of the surrounding area around the vehicle, wherein said detection comprises utilizing an Artificial Neural Network (ANN)-based object detection model to process the top-down representation, the object detection model is configured to identify centers of the plurality of parking slot objects within the top-down representation by:

generating a plurality of heat-maps of the top-down representation, the plurality of heat-maps comprises at least a first heat-map associated with a first parking slot class and a second heat-map associated with a second parking slot class, wherein the first heat-map comprises a first plurality of parking slot objects in the top-down representation, and the second heat-map comprises a second plurality of parking slot objects in the top-down representation, wherein the first plurality of parking slot objects represents first confidence scores that the first plurality of parking slot objects represents a plurality of respective centers of parking slots from the first parking slot class, and the second plurality of parking slot objects represents second confidence scores that the second plurality of parking slot objects represents a plurality of respective centers of parking slots from the second parking slot class, wherein the first and second heat-maps comprise an overlapping parking slot object that is classified as belonging to the first parking slot class and to the second parking slot class; and aggregating the plurality of heat-maps to an aggregated heatmap of the top-down representation, the aggregated heatmap comprises at least a graphical display of the plurality of parking slot objects and markings to distinguish between respective classes of the plurality of parking slot objects, said aggregating comprises selecting the first parking slot class for the overlapping parking slot object from the first and second parking slot classes, whereby the aggregated heatmap excludes the overlapping parking slot object classified as the second parking slot class, whereby the aggregated heatmap comprises the overlapping parking slot object marked as the first parking slot class, the first parking slot class is different than the second parking slot class; and outputting the aggregated heatmap of the plurality of parking slot objects.

2. The method of claim 1, wherein the one or more cameras comprise at least a first camera that captures a front view of the vehicle, a second camera that captures a left view of the vehicle, a third camera that captures a right view of the vehicle, and a fourth camera that captures a back view of the vehicle, wherein the top-down representation is generated based on a combination of images from the first camera, the second camera, the third camera and the fourth camera.

3. The method of claim 1, wherein the plurality of heat-maps correspond to a respective plurality of parking slot classes, the plurality of parking slot classes comprises a vacant parking slot class, a blocked parking slot class, an occupied parking slot class, and an indistinct parking slot class, wherein the vacant parking slot class represents a parking slot that is available for parking by the vehicle, wherein the occupied parking slot class represents a parking slot that is occupied by another vehicle, wherein the blocked parking slot class represents a parking slot that is unavailable for the vehicle although not being occupied, wherein the indistinct parking slot class represents a parking slot that is not classified as vacant, occupied or blocked.

4. The method of claim 1 further comprising generating, for each of the plurality of parking slot objects, an orientation measurement indicating an orientation of a respective parking slot object, wherein said outputting the aggregated heatmap comprises outputting orientation measurements corresponding to the plurality of parking slot objects, wherein the orientation measurement is indicative of an angle of the respective parking slot object.

5. The method of claim 1, wherein said outputting is performed to an autonomous driver of the vehicle, whereby enabling the autonomous driver to park the vehicle in a parking slot without human intervention.

6. The method of claim 1, wherein the detection of the plurality of parking slot objects is performed based on the centers of the plurality of parking slot objects, and without relying on pre-defined on-surface markings that define boundaries of the plurality of parking slot objects in which vehicles are allowed to park.

7. The method of claim 1, wherein the plurality of parking slot objects represents conceptual objects that do not relate to a single type of parking object.

8. The method of claim 1, wherein the object detection model outputs the overlapping parking slot object of the first parking slot class in the first heat-map, the overlapping parking slot object of the second parking slot class in the second heat-map, and a single orientation measurement that is indicative of an angle of the overlapping parking slot object, wherein the angle is applicable to both the first heat-map and the second heat-map.

9. The method of claim 1, wherein the top-down representation of the surrounding area around the vehicle comprises at least a 5-meter front-view of the vehicle.

10. The method of claim 1, wherein the top-down representation of the surrounding area around the vehicle comprises at least 8-meter front-view of the vehicle.

11. The method of claim 1 further comprises generating the top-down representation of the surrounding area around the vehicle, wherein said generating comprises excluding information that is captured by the one or more cameras regarding locations that are further to the vehicle over a pre-defined maximal threshold, wherein the pre-defined maximal threshold is at least 5-meters.

12. The method of claim 3, wherein the markings distinguish between the plurality of parking slot classes.

13. The method of claim 1, wherein the first heat-map indicates for each pixel of the top-down representation, a probability that the pixel represents a center of a respective parking slot object of the first parking slot class, wherein said utilizing the object detection model comprises performing a local search of maximal probability values within the first heat-map to identify candidate pixels for representing the centers of the plurality of parking slot objects belonging to the first parking slot class.

14. The method of claim 1, wherein the first heat-map indicates for each pixel of the top-down representation, a probability that the pixel represents a center of a respective parking slot object of the first parking slot class, wherein the second heat-map indicates for each pixel of the top-down representation, a probability that the pixel represents a center of a respective parking slot object of the second parking slot class,
    wherein a pixel of the overlapping parking slot object of the first parking slot class is associated with a first probability in the first heat-map, wherein the pixel of the overlapping parking slot object of the second parking slot class is associated with a second probability in the second heat-map,
    wherein said aggregating is performed based on a collision rule between the first parking slot class and the second parking slot class, and based on the first probability and the second probability.

15. The method of claim 1, wherein said outputting comprises displaying to a human driver the graphical display of the plurality of parking slots and the markings within the surrounding area around the vehicle.

16. The method of claim 1, wherein the one or more cameras comprise fish-eye cameras.

17. The method of claim 1, wherein the top-down representation of the surrounding area around the vehicle has a 360-degree coverage around the vehicle.

18. A computerized apparatus having a hardware processor, the hardware processor being coupled to a memory, the hardware processor being adapted to perform the steps of:
    obtaining a top-down representation of a surrounding area around a vehicle, the top-down representation is generated based on one or more images from one or more cameras that are mounted on the vehicle;
    performing a detection of a plurality of parking slot objects in the top-down representation of the surrounding area around the vehicle, wherein said detection comprises utilizing an Artificial Neural Network (ANN)-based object detection model to process the top-down representation, the object detection model is configured to identify centers of the plurality of parking slot objects within the top-down representation by:
        generating a plurality of heat-maps of the top-down representation, the plurality of heat-maps comprises at least a first heat-map associated with a first parking slot class and a second heat-map associated with a second parking slot class, wherein the first heat-map comprises a first plurality of parking slot objects in the top-down representation, and the second heat-map comprises a second plurality of parking slot objects in the top-down representation, wherein the first plurality of parking slot objects represents first confidence scores that the first plurality of parking slot objects represents a plurality of respective centers of parking slots from the first parking slot class, and the second plurality of parking slot objects represents second confidence scores that the second plurality of parking slot objects represents a plurality of respective centers of parking slots from the second parking slot class, wherein the first and second heat-maps comprise an overlapping parking slot object that is classified as belonging to the first parking slot class and to the second parking slot class; and
    aggregating the plurality of heat-maps to an aggregated heatmap of the top-down representation, the aggregated heatmap comprises at least a graphical display of the plurality of parking slot objects and markings to distinguish between respective classes of the plurality of parking slot objects, said aggregating comprises selecting the first parking slot class for the overlapping parking slot object from the first and second parking slot classes, whereby the aggregated heatmap excludes the overlapping parking slot object classified as the second parking slot class, whereby the aggregated heatmap comprises the overlapping parking slot object marked as the first parking slot class,
    the first parking slot class is different than the second parking slot class; and
    outputting the aggregated heatmap of the plurality of parking slot objects.

19. A computer program product comprising a non-transitory computer readable storage medium retaining program instructions, which program instructions when read by a processor, cause the processor to perform a method comprising:
    obtaining a top-down representation of a surrounding area around a vehicle, the top-down representation is generated based on one or more images from one or more cameras that are mounted on the vehicle;
    performing a detection of a plurality of parking slot objects in the top-down representation of the surrounding area around the vehicle, wherein said detection comprises utilizing an Artificial Neural Network (ANN)-based object detection model to process the top-down representation, the object detection model is configured to identify centers of the plurality of parking slot objects within the top-down representation by:
        generating a plurality of heat-maps of the top-down representation, the plurality of heat-maps comprises at least a first heat-map associated with a first parking slot class and a second heat-map associated with a second parking slot class, wherein the first heat-map comprises a first plurality of parking slot objects in the top-down representation, and the second heat-map comprises a second plurality of parking slot objects in the top-down representation, wherein the first plurality of parking slot objects represents first confidence scores that the first plurality of parking slot objects represents a plurality of respective centers of parking slots from the first parking slot class, and the second plurality of parking slot objects represents second confidence scores that the second plurality of parking slot objects represents a plurality of respective centers of parking slots from the second parking slot class, wherein the first and second heat-maps comprise an overlapping parking slot object that is classified as belonging to the first parking slot class and to the second parking slot class; and
    aggregating the plurality of heat-maps to an aggregated heatmap of the top-down representation, the aggregated heatmap comprises at least a graphical display of the plurality of parking slot objects and markings to distinguish between respective classes of the plurality of parking slot objects, said aggregating comprises selecting the first parking slot class for the overlapping parking slot object from the first and second parking slot classes, whereby the aggregated heatmap excludes the overlapping parking slot object classified as the second parking slot class, whereby the aggregated heatmap comprises the overlapping parking slot object marked as the first parking slot class the first parking slot class is different than the second parking slot class; and outputting the aggregated heatmap of the plurality of parking slot objects.

\* \* \* \* \*